United States Patent
Mueller

(10) Patent No.: US 11,306,813 B2
(45) Date of Patent: Apr. 19, 2022

(54) PASSIVE PLANETARY EMERGENCY LUBRICATION SYSTEM

(71) Applicant: Bell Textron Inc., Fort Worth, TX (US)

(72) Inventor: Douglas Robert Mueller, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 258 days.

(21) Appl. No.: 16/657,166

(22) Filed: Oct. 18, 2019

(65) Prior Publication Data

US 2021/0116015 A1    Apr. 22, 2021

(51) Int. Cl.
*F16H 57/04* (2010.01)
*F16N 29/02* (2006.01)
*B64D 35/00* (2006.01)

(52) U.S. Cl.
CPC ......... *F16H 57/0442* (2013.01); *B64D 35/00* (2013.01); *F16H 57/045* (2013.01); *F16H 57/0441* (2013.01); *F16H 57/0443* (2013.01); *F16H 57/0445* (2013.01); *F16H 57/0456* (2013.01); *F16H 57/0482* (2013.01); *F16N 29/02* (2013.01); *F16N 2210/08* (2013.01); *F16N 2270/70* (2013.01); *F16N 2280/00* (2013.01)

(58) Field of Classification Search
CPC ............. F16H 57/0442; F16H 57/0443; F16H 57/0445; F16N 2210/08; F16N 2280/00; F16K 17/366; F01M 11/062; F01M 11/065; F01M 11/067
See application file for complete search history.

(56) References Cited

U.S. PATENT DOCUMENTS

| | | | | |
|---|---|---|---|---|
| 1,866,280 A | * | 7/1932 | Woolson | F01M 11/065 184/6.2 |
| 2,239,098 A | * | 4/1941 | Hunter | B64D 37/22 137/38 |
| 2,332,007 A | * | 10/1943 | Parker | F16K 15/042 137/38 |
| 3,685,528 A | * | 8/1972 | Holland | F16K 24/046 137/43 |
| 3,734,113 A | * | 5/1973 | Madden | E04H 4/065 137/40 |
| 4,856,273 A | * | 8/1989 | Murray | F01D 25/18 60/39.08 |
| 4,974,410 A | * | 12/1990 | Wright | F01M 11/067 137/38 |

(Continued)

OTHER PUBLICATIONS

Mueller, Douglas Robert; "Thermostatically Controlled Emergency Lubrication System"; U.S. Appl. No. 16/657,331, filed Oct. 18, 2019; 34 pages.

*Primary Examiner* — Minh Truong
(74) *Attorney, Agent, or Firm* — Shackelford, Bowen, McKinley & Norton, LLP

(57) ABSTRACT

An example of an emergency lubrication system for an aircraft includes a lubricant tank configured to supply a lubricant to a gearbox of the aircraft, a tube coupled between the lubricant tank and the gearbox and comprising a check ball disposed within the tube, a first lubricant line coupled to the tube and a first inlet of the gearbox, and a second lubricant line coupled to the tube and a second inlet of the gearbox.

17 Claims, 7 Drawing Sheets

(56) References Cited

U.S. PATENT DOCUMENTS

| | | | |
|---|---|---|---|
| 8,051,869 B2* | 11/2011 | Parnin | F16K 17/36 137/1 |
| 10,190,672 B2 | 1/2019 | Ehinger | |
| 2006/0090964 A1* | 5/2006 | Hoang | F01M 11/067 184/6.2 |
| 2020/0166119 A1* | 5/2020 | Mueller | F01M 11/065 |
| 2021/0277812 A1* | 9/2021 | Smith | F01M 11/0408 |

* cited by examiner

PASSIVE PLANETARY EMERGENCY LUBRICATION SYSTEM

TECHNICAL FIELD

This invention relates generally to a rotorcraft, and more particularly, to a lubrication system for rotorcraft gearboxes.

BACKGROUND

Rotorcraft drive systems can include various components that produce and transfer power. For example, engines and gearboxes are standard components. Such components generate heat and require lubrication. Excessive levels of heat can cause premature failure and create safety risks. Proper lubrication serves to reduce heat generation and assist in heat removal from moving components within gearboxes.

Typically, rotorcraft use a variety of primary lubrication systems to provide wear protection and heat transfer for moving components. Under normal operating conditions, primary lubrication systems provide proper lubrication and heat removal. However, in the event of a failure of the primary lubrication systems, excessive heat is generated that causes wear and/or failure of components, such as bearings or gears within a gearbox.

Rotorcraft are generally required to maintain manageable flight operations for selected durations of time if the primary lubrication system fails. One method used to satisfy the requirements of manageable flight during a lubrication system failure is to use a secondary, emergency lubrication system to operate when the primary lubrication system fails.

SUMMARY

An example of an emergency lubrication system for an aircraft includes a lubricant tank configured to supply a lubricant to a gearbox of the aircraft, a tube coupled between the lubricant tank and the gearbox and comprising a check ball disposed within the tube, a first lubricant line coupled to the tube and a first inlet of the gearbox, and a second lubricant line coupled to the tube and a second inlet of the gearbox.

An example of a lubrication system for an aircraft includes a primary lubrication system for a gearbox of the aircraft, the primary lubrication system comprising a first lubricant tank and an emergency lubrication system for the gearbox. The emergency lubrication system includes a second lubricant tank configured to supply a lubricant to a gearbox of the aircraft, a tube coupled between the second lubricant tank and the gearbox and comprising a check ball disposed within the tube, a first lubricant line coupled to the tube and a first inlet of the gearbox, and a second lubricant line coupled to the tube and a second inlet of the gearbox.

An example of a method of providing emergency lubrication for an aircraft includes determining if a loss of lubrication event has occurred and, responsive to a determination that the loss of lubrication event has occurred, opening a valve of an emergency lubrication system to provide lubricant to a gearbox of the aircraft. The emergency lubrication system includes a lubricant tank configured to supply a lubricant to a gearbox of the aircraft, a tube coupled between the lubricant tank and the gearbox and comprising a check ball disposed within the tube, a first lubricant line coupled to the tube and a first inlet of the gearbox, and a second lubricant line coupled to the tube and a second inlet of the gearbox.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
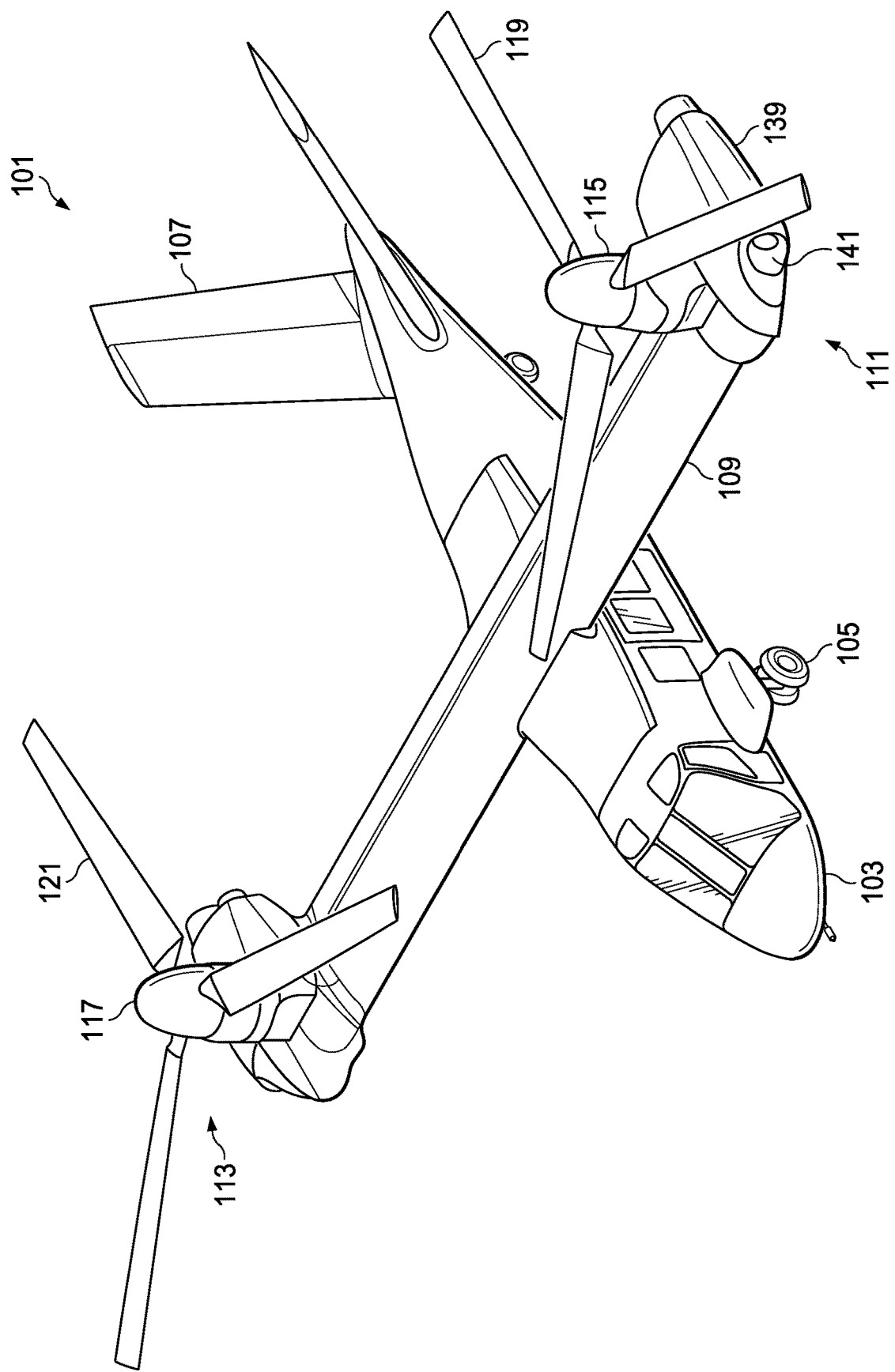
FIG. 1 is a perspective view of a tiltrotor aircraft in helicopter mode, according to aspects of the disclosure.

It is to be understood that the following disclosure provides many different embodiments/aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
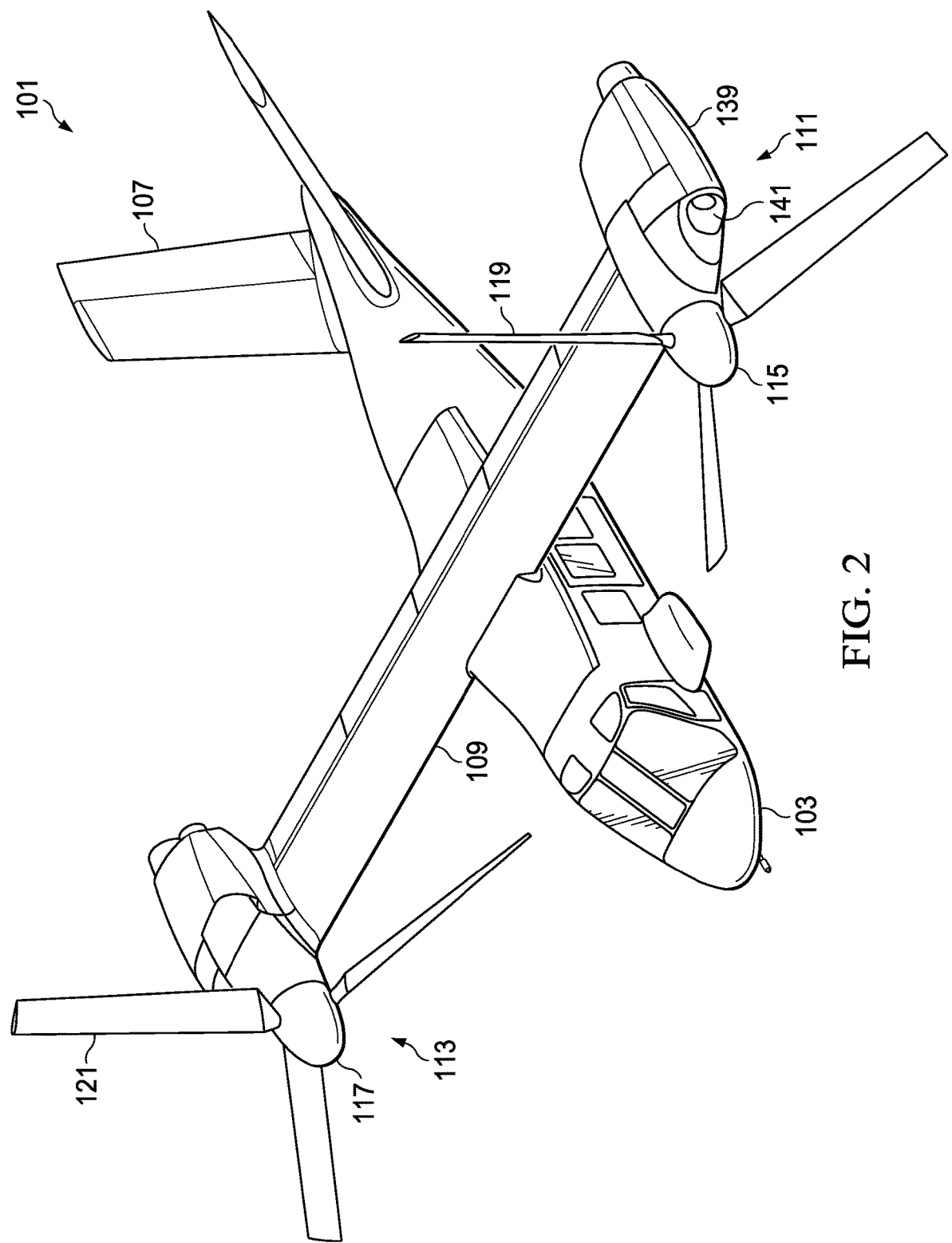
FIG. 2 is a perspective view of a tiltrotor aircraft in airplane mode, according to aspects of the disclosure.

FIGS. 1 and 2 in the drawings illustrate a tiltrotor aircraft 101, according to aspects of the disclosure. Tiltrotor aircraft 101 includes a fuselage 103, a landing gear 105, a tail member 107, a wing 109, a drive system 111, and a drive system 113. Each drive system 111 and 113 includes a fixed engine 139 and a rotatable proprotor 115 and 117, respectively. Each of rotatable proprotors 115 and 117 has a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1 illustrates tiltrotor aircraft 101 in helicopter mode, in which proprotors 115 and 117 are positioned substantially vertical to provide a lifting thrust. FIG. 2 illustrates tiltrotor aircraft 101 in an airplane mode in which proprotors 115 and 117 are positioned substantially horizontal to provide a forward thrust in which a lifting force is supplied by wing 109. It should be appreciated that tiltrotor aircraft 101 can be operated such that proprotors 115 and 117 are selectively positioned between airplane mode and helicopter mode, which can be referred to as a conversion mode.

The drive system 113 is substantially symmetric to the drive system 111; therefore, for sake of efficiency, certain features will be disclosed only with regard to drive system 111. However, one of ordinary skill in the art would fully appreciate an understanding of drive system 113 based upon the disclosure herein of drive system 111. Further, drive systems 111 and 113 are illustrated in the context of tiltrotor aircraft 101; however, drive systems 111 and 113 can be implemented on other tiltrotor aircraft. For example, an alternative embodiment may include a quad tiltrotor that has an additional wing member aft of wing 109; the additional wing member can have additional drive systems similar to drive systems 111 and 113. In another embodiment, drive systems 111 and 113 can be used with an unmanned version of tiltrotor aircraft 101. Further, drive systems 111 and 113 can be integrated into a variety of tiltrotor aircraft configurations. Additionally, other drive systems are contemplated. For example, one example is a gearbox arrangement to provide torque to a rotor system of a helicopter.

Figure 3:
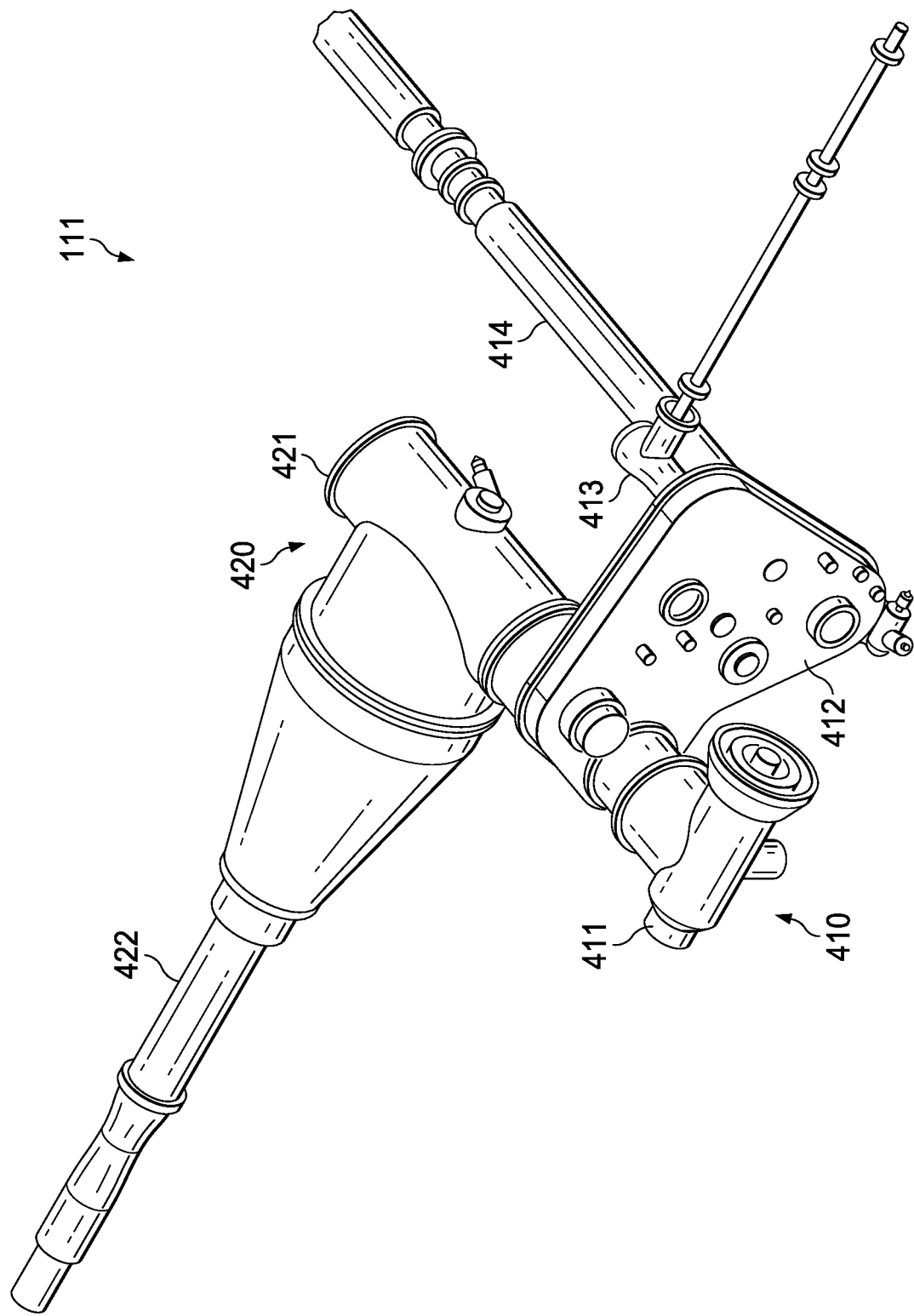
FIG. 3 is a perspective view of a drive system of an exemplary tiltrotor aircraft, according to aspects of the disclosure.

FIG. 3 is a perspective view of drive system 111, according to one example embodiment. Drive system 111 may include a first gearbox assembly 410 and a second gearbox assembly 420. First gearbox assembly 410 may include spiral bevel gearbox 411, interconnect gearbox 412, blower gearbox 413, interconnect driveshaft 414, and engine 139. Second gearbox assembly 420 may include proprotor gearbox 421, and mast 422.

Engine 139 may be fixed relative to wing 109 of tiltrotor aircraft 101 and can provide torque via an engine output shaft to spiral bevel gearbox 411. Spiral bevel gearbox 411 includes spiral bevel gears to change torque direction by approximately ninety degrees from engine 139 to interconnect gearbox 412 via a clutch. Interconnect gearbox 412 can include a plurality of gears, such as helical gears, in a gear train that are coupled to interconnect driveshaft 414, blower gearbox 413, and second gearbox assembly 420. The interconnect gearbox 412 can also be configured to provide power to various system accessories such as alternators, lube and scavenge pumps, hydraulic pumps, and generators.

Proprotor gearbox 421 includes a plurality of gears that are configured to transfer power and reduce rotational speed to mast 422. Blower gearbox 413 is mounted to interconnect gearbox 412 and is configured to provide torque to the oil cooler blower fan, which draws in air for lubricant temperature reduction. Interconnect driveshaft 414 provides a torque path that enables a single engine to provide torque to both drive systems 111 and 113 in the event of a failure of one of the engines.

Gears, bearings, and other mechanical components of drive system 111 are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as a lubricant, between the surfaces to help carry the load (pressure generated) between the opposing surfaces. A lubricant is a substance introduced to reduce friction between moving surfaces. Examples of lubricants include oil, biolubricants derived from plants and animals, synthetic oils, solid lubricants, and aqueous lubricants. Example transmission oils for proprotor gearbox 421 may include oils meeting specifications MIL-PRF-23699 (5 cSt), DOD-L-7808 (3-4 cSt), DOD-PRF-85734 (5 cSt), and other oils in the 9 cSt to 10 cSt viscosity range. Drive system 111 may include one or more lubrication systems to provide lubricant to the mechanical components of drive system 111.

Figure 4:
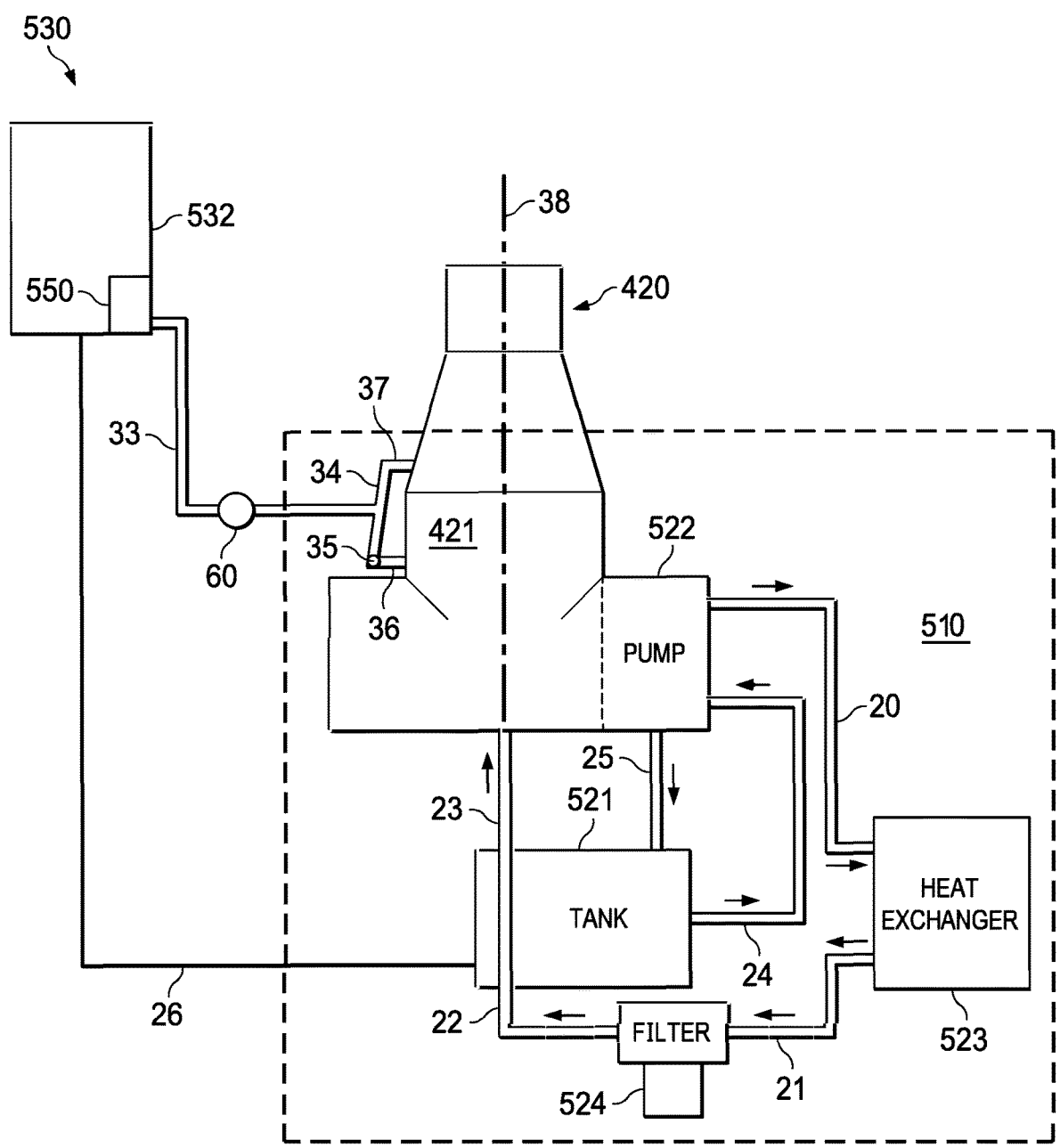
FIG. 4 is a schematic view of a lubrication arrangement of a tiltrotor drive system, according to aspects of the disclosure.
Figure 5:
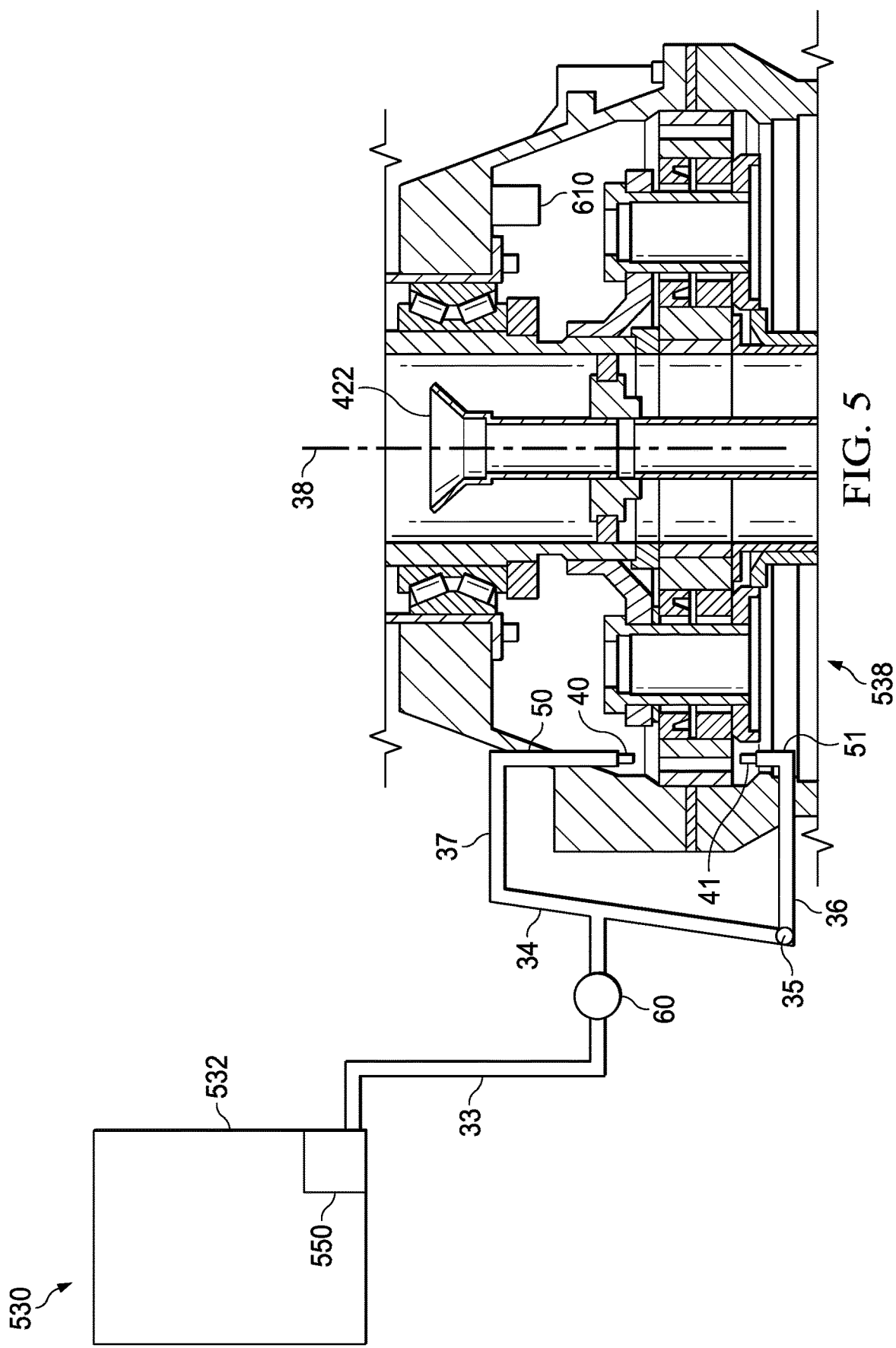
FIG. 5 is a sectioned view of a gearbox of an exemplary lubrication arrangement in a first orientation, according to aspects of the disclosure.
Figure 6:
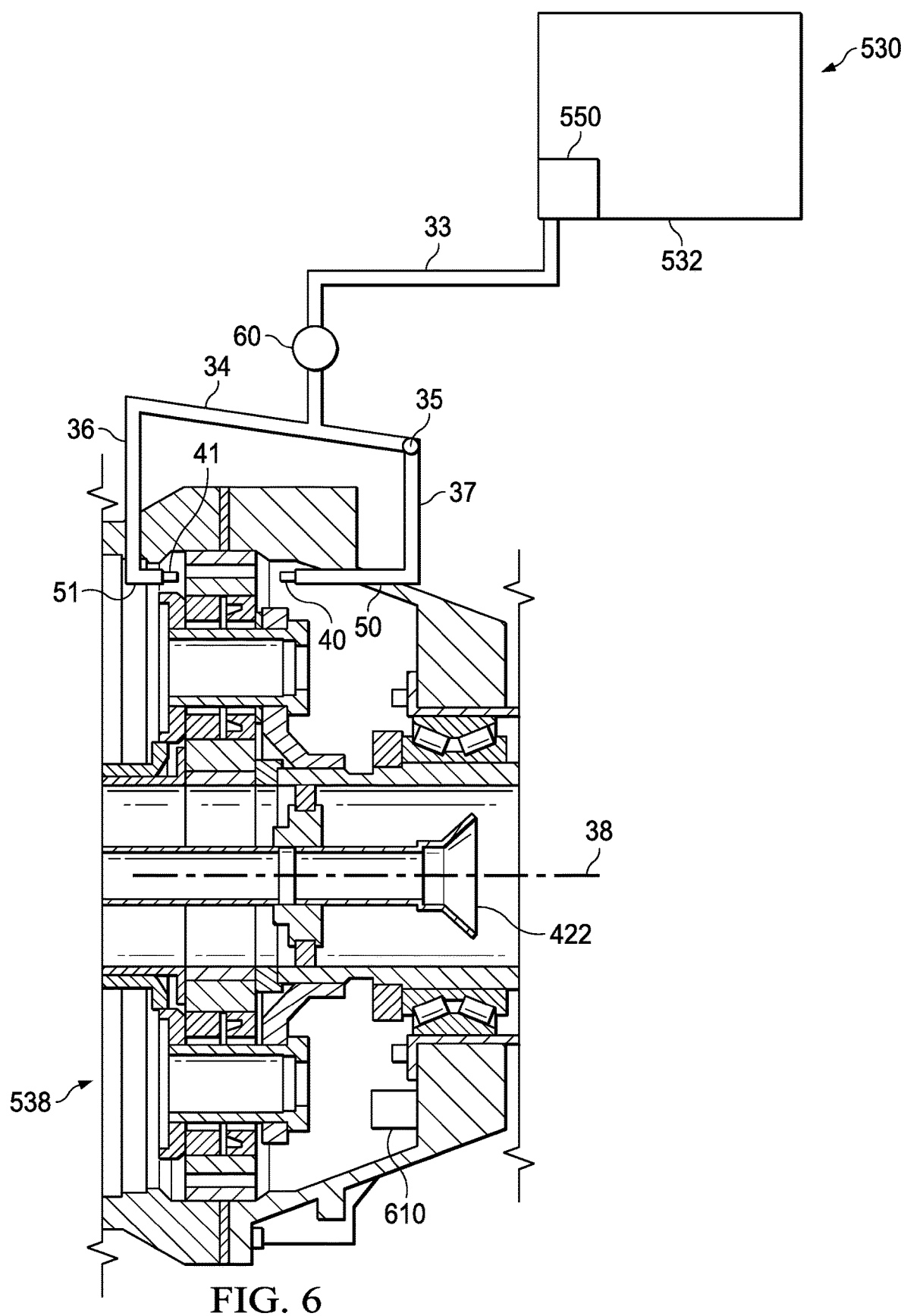
FIG. 6 is a sectioned view of the gearbox of FIG. 5 in a second orientation, according to aspects of the disclosure.

FIGS. 4-6 illustrate an emergency lubrication system 530 for use with a lubrication arrangement 500. FIG. 4 is a schematic view of lubrication arrangement 500, according to aspects of the disclosure. FIG. 5 is a sectioned view of a gearbox of lubrication arrangement 500 in a first orientation (e.g., tiltrotor aircraft 101 in helicopter mode), according to aspects of the disclosure. FIG. 6 is a sectioned view of the gearbox of FIG. 5 in a second orientation (e.g., tiltrotor aircraft 101 in airplane mode), according to aspects of the disclosure. Lubrication arrangement 500 includes a primary lubrication system 510 and an emergency lubrication system 530. Primary lubrication system 510 provides lubricant to components of second gearbox assembly 420. Primary lubrication system 510 includes a primary lubricant tank 521, a pump 522, a heat exchanger 523, a filter 524, and lubricant lines 20 through 25. Primary lubrication system 510 may also include other components such as one or more sensors, pressure regulators, flowmeters, check valves, and jets, which are not depicted in the schematic view of FIG. 4.

Primary lubricant tank 521 represents reservoirs that store lubricant within primary lubrication system 510. Primary lubricant tank 521 may be integral with the housing of one of the gearboxes, such as proprotor gearbox 421, or separate from the housing of proprotor gearbox 421. Pump 522 represents devices that can be configured to circulate pressurized lubricant throughout primary lubrication system 510. Heat exchanger 523 represents devices configured to lower a temperature of the lubricant before the lubricant is applied to the various components that generate heat. Filter 524 represents devices configured to remove contaminants from the lubricant. In some aspects, primary lubrication system 510 includes jets configured to dispense lubricant on components of drive system 111 that are subject to friction and/or generate heat, such as gears and bearing.

In some aspects, lubricant arrangement 500 includes one or more sensors 610 (see FIGS. 5 and 6) that are configured to detect one or more parameters of tiltrotor aircraft 101. For example, the one or more sensors 610 can include temperature sensors that monitor a temperature of the lubricant, gears, or other components of lubricant arrangement 500 and/or pressure sensors that detect the pressure of the lubricant within primary lubrication system 510. Examples of temperature sensors include thermocouples, resistance-based sensors, and the like. Examples of pressure sensors may include strain-gauge sensors, capacitive sensors, electromagnetic sensors, piezoelectric sensors, optical sensors, potentiometric sensors, resonant sensors, and thermal sensors, and the like.

Lubricant lines 20 through 25 represent fluid lines that connect various components of primary lubrication system 510. Lubricant lines 20 through 25 may comprise rigid pipelines, such as core passages in the housing of a gearbox, or flexible hoses, such as fluoropolymer tubing. The type of lubricant lines used may depend on the location of the line or expected fluid pressure within the line. Lubricant lines 20 through 25 may include other components such as swivels and quick disconnect couplings. In some examples, lubricant lines 20 through 25 may be collapsible in order to reduce residual lubricant during storage and when lubricant is not being flowed through the line.

As mentioned, lubricant lines 20 through 25 may fluidly connect various components of primary lubrication system 510. Lubricant lines 20 through 25 may fluidly connect components of primary lubrication system 510. For example, pump 522 may deliver lubricant from primary lubricant tank 521 to lubricant line 20, from lubricant line 20 to heat exchanger 523 where the lubricant is cooled. From heat exchanger 523, the lubricant may then be delivered to filter 524, via line 21, where particles may be removed from the lubricant. From filter 524, the lubricant may travel through line 22 to primary lubricant tank 521.

Referring now specifically to FIGS. 5 and 6, second gearbox assembly 420 is shown in partial cross-section and in first and second orientations, respectively. Second gearbox assembly 420 includes a planetary gear/bearing assembly 538 that is coupled to mast 422. Mast 422 is coupled to and drives a proprotor, such as one of proprotors 115, 117. Planetary gear/bearing assembly 538 is set inside a housing 542. Planetary gear/bearing assembly 538 includes various components such as a sun gear, planetary gears, and a ring gear. Under normal operating conditions, primary lubrication system 510 provides proper lubrication to the moving components of second gearbox assembly 420. During normal operating conditions, lubricant pressure within second gearbox assembly 420 may be, for example, fifty PSI (pounds per square inch). If for example, proper lubrication is not provided to the moving components of second gearbox assembly 420 or primary lubrication system 510 experiences a loss of lubrication, the moving components of second gearbox assembly 420 may experience excessive wear, overheating, or failure of components. One example cause of a loss of lubrication may be a leak between the casing of one of the gearboxes and one of its components. In some loss of lubrication circumstances, the lubricant pressure within second gearbox assembly 420 may be reduced to an undesired level or the temperature may increase to an undesired level. For example, the pressure may drop below thirty PSI, and in some instances may drop to zero PSI. Rotorcraft are generally required to maintain manageable flight operations for selected durations of time if the rotorcraft experiences low lubricant pressure, such as during a loss of lubrication situation or lubrication system failure. For example, an aviation agency may require that the loss of lubrication will not prevent continued safe operation for at least thirty minutes after perception by the flight crew of the lubrication system failure or loss of lubrication. Therefore, some aircraft include a secondary or emergency lubrication system, such as emergency lubrication system 530.

Emergency lubrication system 530 includes a secondary lubricant tank 532 that is fluidly coupled to second gearbox assembly 420 via lubricant line 33. Lubricant line 33 is coupled to a tube 34 that houses a check ball 35. The operation of check ball 35 is discussed in more detail below. In some aspects a valve 60 is coupled inline with lubricant line 33 to control the flow of lubricant from secondary lubricant tank 532 to second gearbox assembly 420. For example, valve 60 remains closed until a loss of lubrication event is detected. In the event of a loss of lubrication, valve 60 is opened to allow lubricant to flow from secondary lubricant tank 532 to second gearbox assembly 420. Operation of valve 60 is discussed in more detail relative to FIG. 7.

In some aspects, no valve 60 is used. In these aspects, secondary lubricant tank 532 is a reservoir that stores excess lubricant from primary lubricant tank 521 of primary lubrication system 510. Excess lubricant is fed from primary lubricant tank 521 to secondary lubricant tank 532 via a lubricant line 26. In aspects with no valve 60, lubricant is continually supplied to second gearbox assembly 420 by emergency lubrication system 530. In the event of a loss of lubrication, the reservoir of excess lubricant stored by secondary lubricant tank 532 is automatically or passively metered out to second gearbox assembly 420 to provide emergency lubrication for a limited amount of time (e.g., until secondary lubricant tank 532 runs out of lubricant). The operation of emergency lubrication system 530 is passive in that no action needs to be taken by the pilot or any system of tiltrotor aircraft 101 to begin supplying lubricant to second gearbox assembly 420. In one aspect, secondary lubricant tank 532 may be configured to hold approximately seven gallons of lubricant. In other aspects, secondary lubricant tank 532 can be sized as needed for a particular application.

FIGS. 4 and 5 illustrate second gearbox assembly 420 in a first orientation (e.g., helicopter mode with second gearbox assembly 420 oriented vertically). FIG. 6 illustrates second gearbox assembly 420 in a second orientation (e.g., airplane mode with second gearbox assembly 420 oriented horizontally). In the first orientation, tube 34 is oriented generally vertically, but is angled slightly relative to an axis 38 passing through mast 422 of second gearbox assembly 420. In the first orientation, check ball 35 falls to a lower end of tube 34 as illustrated in FIGS. 4 and 5. With check ball 35 positioned in the lower end of tube 34, a lubricant line 36 is blocked by check ball 35 and lubricant from secondary lubricant tank 532 cannot flow therethrough. As a result, lubricant from secondary lubricant tank 532 flows to second gearbox assembly 420 via lubricant line 33, tube 34, and a lubricant line 37. Lubricant line 37 enters second gearbox assembly 420 via an inlet 50.

In the second orientation, tube 34 is oriented generally horizontally, but is angled relative to axis 38 so that tube 34 slopes downward toward lubricant line 37. The downward slope of tube 34 in the second orientation urges check ball 35 to roll toward lubricant line 37 and into the position illustrated in FIG. 6. With check ball 35 positioned as illustrated in FIG. 6, lubricant line 37 is blocked by check ball 35 and lubricant from secondary lubricant tank 532 cannot flow therethrough. As a result, lubricant from secondary lubricant tank 532 flows to second gearbox assembly 420 via lubricant line 33, tube 34, and lubricant line 36. Lubricant line 36 enters second gearbox assembly 420 via an inlet 51.

Emergency lubrication system 530 is designed to provide lubricant to different portions of second gearbox assembly 420 depending on the orientation of second gearbox assembly 420. Providing lubricant to different portions of second gearbox assembly 420 based upon the orientation of second gearbox assembly 420 can improve the lubrication of components therein. For example, in a loss of lubrication event with second gearbox assembly 420 in the first orientation, emergency lubrication system 530 provides lubricant from a position above a gear set of planetary gear/bearing assembly 538 (e.g., see FIG. 5). In some aspects, lubricant line 37 injects or sprays lubricant into second gearbox assembly 420 via a jet 40 coupled to an end of lubricant line 37. Injecting or spraying lubricant from above the gear set increases the likelihood that lubricant is directly applied to the gear set. In an emergency situation, ensuring proper lubrication is critical to keep the temperature of second gearbox assembly 420 within a safe range.

In a loss of lubrication event with second gearbox assembly 420 in the second orientation, emergency lubrication system 530 provides lubricant to an opposite side of the gear set of planetary gear/bearing assembly 538. In some aspects, lubricant line 36 injects or sprays lubricant into second gearbox assembly 420 via a jet 41 coupled to an end of lubricant line 36. Providing lubricant from the opposite side can be beneficial to ensure that lubricant is applied directly to the gear set. In some aspects, supplying lubricant via jet 40 when second gearbox assembly 420 is in the second orientation will not supply adequate lubricant to the gear set of planetary gear/bearing assembly 538.

In some aspects, lubricant is provided from secondary lubricant tank 532 to second gearbox assembly 420 via a gravity feed system. In a gravity feed system, secondary lubricant tank 532 is positioned within tiltrotor aircraft 101 such that an outlet 533 of secondary lubricant tank 532 is at a height that is greater than a height of inlets 50, 51 of second gearbox assembly 420. For lubricant to flow from secondary lubricant tank 532, valve 60 must be opened. Operation of valve 60 is discussed in more detail relative to FIG. 7. In other embodiments, secondary lubricant tank 532 optionally includes a pressurizing device 550 to provide lubricant to second gearbox assembly 420. Pressurizing device 550 may be, for example, a mechanically driven pump, a hydraulically driven pump, an electrically driven pump, or the like.

Figure 7:
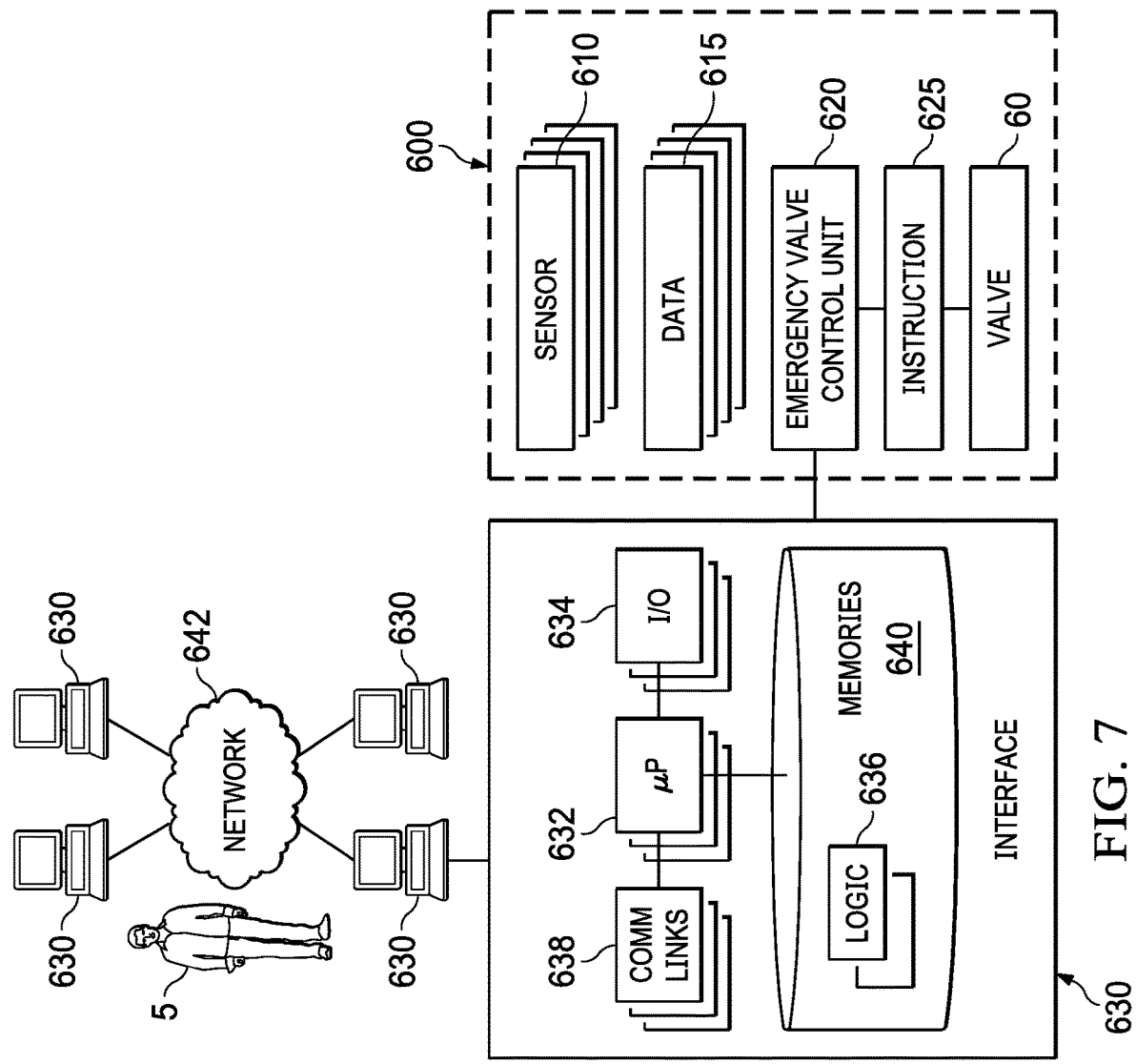
FIG. 7 is a schematic view of a valve control system, according to aspects of the disclosure.

FIG. 7 is a schematic view of an emergency valve control system 600, according to aspects of the disclosure. Emergency valve control system 600 can include an emergency valve control unit 620 that can be configured to receive data 615 from one or more sensors 610 of tiltrotor aircraft 101 (e.g., pressure or temperature data). Emergency valve control unit 620 may also be configured to send instructions 625 to valve 60 to control the operation thereof. Emergency valve control unit 620 may represent a computer that is configured to receive data 615; data 615 may represent one of more rotorcraft parameters, such as the pressure of lubricant within primary lubrication system 510 or the temperature of the lubricant in primary lubrication system 510.

Emergency valve control unit 620 may analyze data 615 to determine whether a loss of lubricant event has occurred. In one example embodiment, emergency valve control unit 620 may analyze data 615 to determine whether the loss of lubricant event occurred within gearbox assemblies 410 or 420.

Emergency valve control unit 620 may analyze data 615 by comparing data 615 to a threshold value. In one example embodiment, the threshold value may be a specific pressure within primary lubrication system 510, such as thirty PSI. Therefore, emergency valve control unit 620 may receive and monitor the lubricant pressure within primary lubrication system 510 and compare it to the threshold value of thirty PSI. If the pressure within primary lubrication system 510 is reduced to a value less than thirty PSI, emergency valve control unit 620 would instruct valve 60 to open in order to allow emergency lubrication to be provided to the working components of second gearbox assembly 420.

During a loss of lubricant event within primary lubrication system 510, emergency valve control unit 620 may send an instruction 625 to valve 60 to open. Vale 60 can be any of a variety of remotely operable valves. For example, valve 60 may be a solenoid valve or the like.

Teachings of certain embodiments recognize that emergency valve control unit 620 may be implemented by one or more computers 10 communicating across one or more networks 642 and accessible by a user 5. An example of computer system 630 may include, but is not limited to, a flight control computer installed on board an aircraft such as tiltrotor aircraft 101. In various embodiments, elements of emergency valve control unit 620 may be installed on board an aircraft, off-board (such as at a ground facility), or a combination of the two. For example, in one embodiment, some elements of emergency valve control unit 620 are installed on board the aircraft whereas other elements of emergency valve control unit 620 are installed off-board such that an onboard computer may include the capability to determine the appropriate instruction 625 during flight as well as the capability to upload/download information to an offboard computer between flights.

Computer system 630 may be used by emergency valve control unit 620 to input the data 615 from one or more sensors 610, determine whether to send an instruction 625 to valves 60 to open or close. Users 5 may access emergency valve control unit 620 through computer systems 630. Users 5 may include any individual, group of individuals, entity, machine, and/or mechanism that interacts with computer systems 630. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 630 may include processors 632, input/output devices 634, network interfaces 638, and memory 640. In other embodiments, computer system 630 may include more, less, or other components. Computer system 630 may be operable to perform one or more operations of various embodiments. Although the embodiment shown provides one example of computer system 630 that may be used with other embodiments, such other embodiments may utilize computers other than computer system 630. Additionally, embodiments may also employ multiple computer systems 630 or other computers networked together in one or more public and/or private computer networks, such as one or more networks 642.

Processors 632 represent devices operable to execute logic contained within a medium. Examples of processor 632 include one or more microprocessors, one or more applications, and/or other logic. Computer system 630 may include one or multiple processors 632.

Input/output devices 634 may include any device or interface operable to enable communication between computer system 630 and external components, including communication with a user or another system. Example input/output devices 634 may include, but are not limited to, a mouse, keyboard, display, and printer.

Network interfaces 638 are operable to facilitate communication between computer system 630 and another element of a network, such as other computer systems 630. Network interfaces 638 may connect to any number and combination of wireline and/or wireless networks suitable for data transmission, including transmission of communications. Network interfaces 638 may, for example, communicate audio and/or video signals, messages, internet protocol packets, frame relay frames, asynchronous transfer mode cells, and/or other suitable data between network addresses. Network interfaces 638 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 640 represents any suitable storage mechanism and may store any data for use by computer system 630. Memory 640 may comprise one or more tangible, computer-readable, and/or computer-executable storage medium. Examples of memory 640 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 640 stores logic 636. Logic 636 facilitates operation of computer system 630. Logic 636 may include hardware, software, and/or other logic. Logic 636 may be encoded in one or more tangible, non-transitory media and may perform operations when executed by a computer. Logic 636 may include a computer program, software, computer executable instructions, and/or instructions capable of being executed by computer system 630. Example logic 636 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 636 may also be embedded within any other suitable medium without departing from the scope of the invention.

Various communications between computers 10 or components of computers 10 may occur across a network, such as network 642. Network 642 may represent any number and combination of wireline and/or wireless networks suitable for data transmission. Network 642 may, for example, communicate internet protocol packets, frame relay frames, asynchronous transfer mode cells, and/or other suitable data between network addresses. Network 642 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 642, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Lubrication systems 510 and 530 have been described relative to tiltrotor aircraft 101. It will be appreciated by those of skill in the art that emergency lubrication system may be used with other types of aircraft, such as airplanes, helicopters, and the like.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as understood by a person of ordinary skill in the art. For example, within 1%, 2%, 3%, 5%, and 10% of what is specified herein.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

The invention claimed is:

1. An emergency lubrication system for an aircraft, the emergency lubrication system comprising:
   a lubricant tank configured to supply a lubricant to a gearbox of the aircraft;
   a tube coupled between the lubricant tank and the gearbox and comprising a check ball disposed within the tube;
   a first lubricant line coupled to the tube and a first inlet of the gearbox; and
   a second lubricant line coupled to the tube and a second inlet of the gearbox;
   wherein the tube is oriented so that the check ball moves to a first end of the tube to block a flow of the lubricant to the first lubricant line when the gearbox is oriented in a first configuration and so that the check ball moves to a second end of the tube to block the flow of the lubricant to the second lubricant line when the gearbox is oriented in a second configuration.

2. The emergency lubrication system of claim 1, wherein the lubricant is provided to the gearbox at a first location when the gearbox is oriented in the first configuration and the lubricant is provided to the gearbox at a second location when the gearbox is oriented in the second configuration.

3. The emergency lubrication system of claim 2, wherein the first location is a first side of an interface of a planetary gear and a ring gear of the gearbox and wherein the second location is a second side of an interface of the planetary gear and the ring gear.

4. The emergency lubrication system of claim 1, wherein:
   the lubricant tank comprises an outlet; and the outlet is positioned at a height above the first and second inlets to allow a gravity feed of the lubricant from the lubricant tank to the gearbox.

5. The emergency lubrication system of claim 1, comprising a pump disposed within the lubricant tank and configured to supply the lubricant to the gearbox.

6. The emergency lubrication system of claim 1, wherein the first lubricant line comprises a first jet configured to inject the lubricant at a first location within the gearbox and the second lubricant line comprises a second jet configured to inject the lubricant at a second location within the gearbox.

7. A lubrication system for an aircraft, the lubrication system comprising:
   a primary lubrication system for a gearbox of the aircraft, the primary lubrication system comprising a first lubricant tank;
   an emergency lubrication system for the gearbox, the emergency lubrication system comprising:
      a second lubricant tank configured to supply a lubricant to a gearbox of the aircraft;
      a tube coupled between the second lubricant tank and the gearbox and comprising a check ball disposed within the tube;
      a first lubricant line coupled to the tube and a first inlet of the gearbox; and
      a second lubricant line coupled to the tube and a second inlet of the gearbox;
      wherein the tube is oriented so that the check ball moves to a first end of the tube to block a flow of the lubricant to the first lubricant line when the gearbox is oriented in a first configuration and so that the check ball moves to a second end of the tube to block the flow of the lubricant to the second lubricant line when the gearbox is oriented in a second configuration.

8. The lubrication system of claim 7, wherein the lubricant is provided to the gearbox at a first location when the gearbox is oriented in the first configuration and the lubricant is provided to the gearbox at a second location when the gearbox is oriented in the second configuration.

9. The lubrication system of claim 8, wherein the first location is a first side of an interface of a planetary gear and a ring gear of the gearbox and wherein the second location is a second side of an interface of the planetary gear and the ring gear.

10. The lubrication system of claim 7, wherein:
    the second lubricant tank comprises an outlet; and
    the outlet is positioned at a height above the first and second inlets to allow a gravity feed of the lubricant from the second lubricant tank to the gearbox.

11. The lubrication system of claim 7, comprising a pump disposed within the second lubricant tank and configured to supply the lubricant to the gearbox.

12. The lubrication system of claim 7, wherein the first lubricant line comprises a first jet configured to inject the lubricant at a first location within the gearbox and the second lubricant line comprises a second jet configured to inject the lubricant at a second location within the gearbox.

13. A method of providing emergency lubrication for an aircraft, the method comprising:
    determining if a loss of lubrication event has occurred;
    responsive to a determination that the loss of lubrication event has occurred, opening a valve of an emergency lubrication system to provide lubricant to a gearbox of the aircraft;
    wherein the emergency lubrication system comprises:
       a lubricant tank configured to supply a lubricant to a gearbox of the aircraft;
       a tube coupled between the lubricant tank and the gearbox and comprising a check ball disposed within the tube;
       a first lubricant line coupled to the tube and a first inlet of the gearbox; and
       a second lubricant line coupled to the tube and a second inlet of the gearbox;
       wherein: the check ball is positioned to block a flow of the lubricant to the first lubricant line when the gearbox is oriented in a first orientation;
    and the check ball is positioned to block the flow of the lubricant to the second lubricant line when the gearbox is oriented in a second orientation.

14. The method of claim 13, comprising
    providing the lubricant from the lubricant tank to the gearbox via the first lubricant line when the gearbox is in the first orientation; and
    providing the lubricant from the lubricant tank to the gearbox via the second lubricant line when the gearbox is in the second orientation.

15. The method of claim 13, wherein:
    the lubricant tank comprises an outlet; and
    the outlet is positioned at a height above the first and second inlets to allow a gravity feed of the lubricant from the lubricant tank to the gearbox.

16. The method of claim 13, wherein the emergency lubrication system comprises a pump disposed within the lubricant tank and configured to supply the lubricant to the gearbox.

17. The method of claim 13, wherein the first lubricant line comprises a first jet configured to inject the lubricant at a first location within the gearbox and the second lubricant line comprises a second jet configured to inject the lubricant at a second location within the gearbox.

* * * * *